United States Patent [19]

Ramaswamy et al.

[11] Patent Number: 5,678,059
[45] Date of Patent: Oct. 14, 1997

[54] TECHNIQUE FOR TIME-SHARING A MICROPROCESSOR BETWEEN A COMPUTER AND A MODEM

[75] Inventors: Velraj Ramaswamy, Middletown; Michael David Rauchwerk, Holmdel, both of N.J.

[73] Assignee: Lucent Technologies Inc., Murray Hill, N.J.

[21] Appl. No.: 198,743

[22] Filed: Feb. 18, 1994

[51] Int. Cl.⁶ .................................................. G06F 13/10
[52] U.S. Cl. .................. 395/821; 395/800; 364/DIG. 1; 364/231.4; 364/231.7; 364/238.5
[58] Field of Search .................................. 395/800, 200, 395/500, 280; 364/DIG. 1, DIG. 2, 705.05; 375/8

[56] References Cited

U.S. PATENT DOCUMENTS

| | | | |
|---|---|---|---|
| 4,815,034 | 3/1989 | Mackey | 364/DIG. 2 |
| 4,943,942 | 7/1990 | Dunnion | 364/900 |
| 4,965,641 | 10/1990 | Blackwell et al. | 375/7 |
| 5,142,624 | 8/1992 | Patrick, II | 395/200 |
| 5,170,470 | 12/1992 | Pindar et al. | 395/275 |
| 5,195,130 | 3/1993 | Weiss et al. | 379/98 |
| 5,497,339 | 3/1996 | Bernard | 364/705.05 |

FOREIGN PATENT DOCUMENTS

| | | | |
|---|---|---|---|
| 0168034 | 1/1986 | European Pat. Off. . | |
| 0 168 034 | 1/1986 | European Pat. Off. | G06F 9/44 |
| 9212480 | 7/1992 | WIPO . | |
| WO-A-92/ 12480 | 7/1992 | WIPO | G06F 9/455 |

OTHER PUBLICATIONS

Finnegan, "Hook and Monitor Any 16-bit Windows Function with Our ProcHook DLL", *Microsoft System Journal*, Jan. 1994, pp. 45–54, 56, 58, 60, 62–63, 66–69.

*Primary Examiner*—Meng-Ai T. An
*Assistant Examiner*—Walter D. Davis
*Attorney, Agent, or Firm*—David R. Padnes

[57] ABSTRACT

A personal computer's microprocessor is time-shared to provide the functions formerly provided by a microprocessor dedicated to a modem. This technique is transparent to software applications programs which interact with a modem. The personal computer utilizes an operating system, such as the Microsoft Windows operating system, in which a portion of the operating system, known as the communications driver, provides the interface between the operating system and the personal computer's serial and parallel communication ports. All communications between the communications driver and the rest of the operating system are examined. Those communications destined for a particular port associated with a modem not having a dedicated microprocessor are redirected while other communications destined for other ports are passed to the Microsoft Windows communications driver. The redirected communications are coupled to a software application program which utilizes the PC microprocessor to carry out the functions formerly provided by the modem microprocessor. As a result, the modem's microprocessor and associated RAM and ROM can be eliminated. The software application program can be loaded into the personal computer's memory only when required.

7 Claims, 3 Drawing Sheets

TECHNIQUE FOR TIME-SHARING A MICROPROCESSOR BETWEEN A COMPUTER AND A MODEM

TECHNICAL FIELD

The present invention relates to modems and, more particularly, to a technique wherein a modem and personal computer time-share a microprocessor.

BACKGROUND OF THE INVENTION

Modem modems are designed for use either within or external to a personal computer. In the former case, the modem is a plug-in card which mounts in a slot within the personal computer while, in the latter case, the modem is an adjunct which is connected via a cable to the personal computer. In either case, the modem provides two different data communication functions. The first function is source level protocols, such as data compression and error correction, and the second function is signal processing, such as that associated with modulating and demodulating data on an analog phone line. These two functions are provided by two distinct major processing elements regardless of whether the modem is designed for use external to or within a personal computer. FIG. 1 shows a block schematic diagram of an illustrative modem 100 designed for use external to a personal computer. Modem 100 includes microprocessor 101 and signal processor 102. Microprocessor 101 interacts with RAM 103 and ROM 104 to perform the source level protocols while digital signal processor (DSP) 102 performs the signal processing. The modem also includes a Universal Asynchronous Receiver Transmitter (UART), designated as by reference numeral 105. Communications between modem 100 and personal computer (PC) 107 is provided by a cable 106 which interconnects UART 105 with a similar UART 108 in the personal computer. UART 108 communicates with the PC's microprocessor 110 via computer bus 109.

FIG. 2 shows a prior art modem 200 which is configured for mounting within a personal computer. Modem 200 is very similar to modem 100 except that UART 108 is now located within modem 200, cable 106 of FIG. 1 is replaced by a printed circuit path 206 and communication between modem 200 and the PC is via bus 109. Comparing the drawing figures, it will be noted that the effect of moving a modem within a PC is to move the interface between these devices.

A major modem cost component is the microcontroller subsystem, which includes the microprocessor 101 and the significant amount of RAM 103 and ROM 104 required by the functions provided by the microprocessor. Since a majority of the modems sold are connected to PCs, and the PC generally has a high performance microprocessor with large amounts of memory, a significant cost saving could be had in the manufacture of a modem if the source level protocol function normally executed by microprocessor 101 could be absorbed into the PC, i.e., provided by the PC's microprocessor. Moreover, since a large number of different software application programs exist, it would be highly desirable if any technique for time-sharing a microprocessor between a modem and PC does not require any modification of the existing applications, i.e., the approach is "transparent" to such programs.

SUMMARY OF THE INVENTION

Broadly, the present invention relates to a technique for utilizing a personal computer's microprocessor in a time-shared manner to provide the functions formerly provided by a modem's microprocessor. Advantageously, this technique is transparent to software applications programs.

In the disclosed embodiment, the personal computer utilizes an operating system having a portion known as the communication driver, which provides a mandatory interface between the operating system and all serial and parallel communication ports. One such operating system is the widely-used Microsoft® Windows™ operating system. (Microsoft is a registered trademark and Windows is a trademark of Microsoft Corporation.) In accordance with the present invention, all communications between the operating system and its communications driver are redirected if such communications are destined for one or more predetermined communication ports. In the disclosed embodiment, the personal computer has a number of parallel and serial communication ports and those communications destined to a particular serial port are redirected, while other communications destined for other ports are passed to the Windows communications driver. Those redirected communications are coupled to a software application program which utilizes the PC microprocessor to carry out the functions formerly provided by the modem microprocessor. As a result, the modem's microprocessor and associated RAM and ROM can be eliminated. This reduces the modem's size, power requirements and cost which is particularly desirable in many communications applications, such as modem implementation within portable personal computers. Advantageously, the present invention can be adapted to load the software application program into the personal computer's memory only when needed. As a result, more computer memory is available when the present invention is not in use.

DETAILED DESCRIPTION

The IBM-compatible PC was designed to be an "open" architecture, i.e., critical information necessary for peripheral devices manufactured by third parties to properly interact with the PC is publicly available. Indeed, the amount of information available was sufficient to design a functional equivalent to the IBM PC. For example, IBM released information on the Bus system, the Basic I/O System (Bios), Peripheral Devices and Operating System (MS-DOS®). (MS-DOS is a registered trademark of Microsoft Corporation.) The IBM PC had a specific device (8250 UART) that was used for serial communications in the PC. The evolution of communications application software for the MS-DOS operating system used in the PC requires serial communications between the PC and peripherals to pass through this UART. Typically each application program provided its own software layer to interface with this UART. In more recent operating systems, such as the Microsoft Windows operating system, a uniform software communications driver, known as "COM driver", is provided between the UART and the rest of the operating system. All modem communications software applications are forced to use this software layer. Indeed, all communications destined for any parallel or serial communication port passes through the COM driver. Such parallel and serial communication ports are respectively associated with a peripheral device. We have recognized that the use of this uniform software layer readily permits the replacement of the UART functionality with an arbitrary interface.

Figure 1:
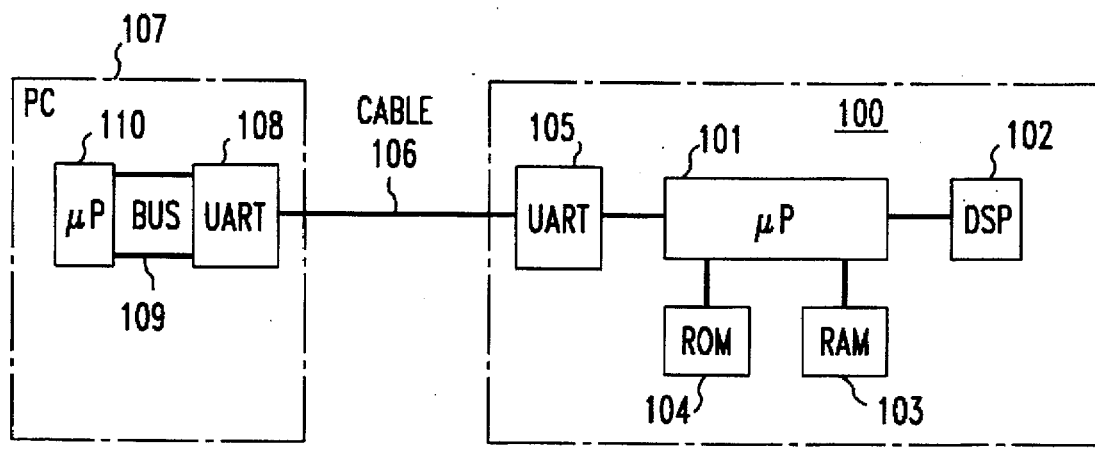
FIG. 1 is a block-schematic diagram of a prior art modem configured for use external to a personal computer.
Figure 2:
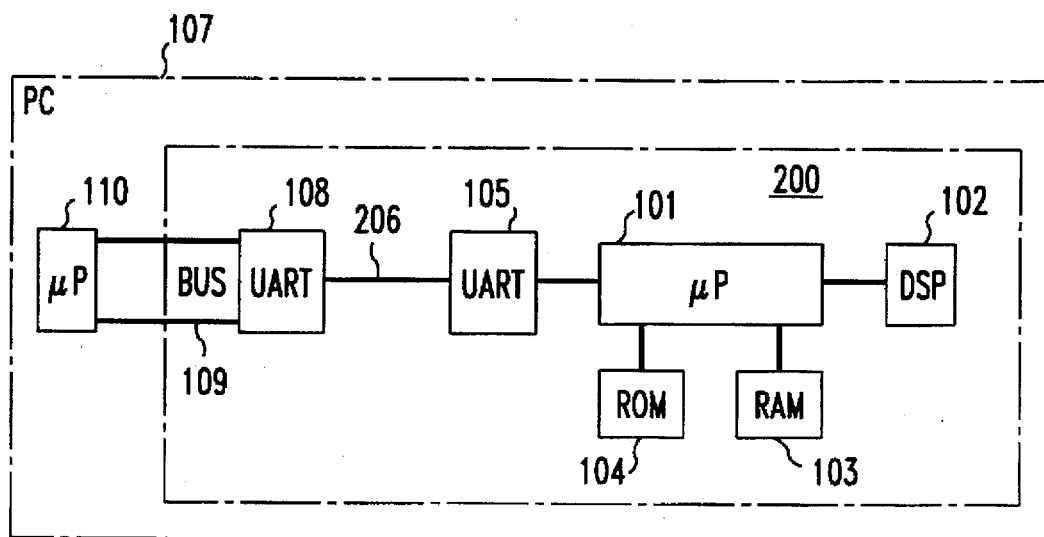
FIG. 2 is a block-schematic diagram of a prior art modem configured for use within a personal computer.

The gist of Applicants' invention relates to the notion of utilizing the PC's microprocessor, RAM and ROM to provide the functions priorly provided by the modem microprocessor 101, RAM 103 and ROM 104 shown in FIGS. 1 and 2. Since the PC microprocessor is not dedicated for communication functions, use of the PC microprocessor to provide the modem microprocessor functionality must be provided on a time-shared basis. Advantageously, we have accomplished the above microprocessor substitution in a manner which is transparent, i.e., does not require modification of existing communications application software written to run under the Microsoft Windows operating system.

Figure 3:
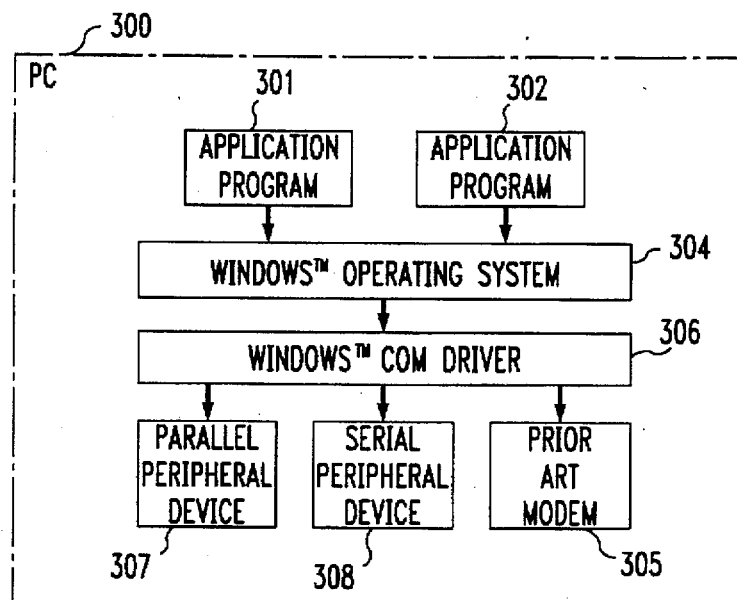
FIG. 3 is a block-schematic diagram of the architecture of an illustrative prior art personal computer architecture.

Before proceeding further, it is advantageous to review the operation of an operating system which utilizes a mandatory interface between the operating system and all serial and parallel communication ports. For purposes of illustration, the Microsoft Windows Operating System architecture will be discussed. Refer now to FIG. 3 which shows a number of different software application programs designated as 301 and 302 running under the Microsoft Windows Operating System 304 in PC 300. Application program 301 provides modem communications via a conventional prior an modem 305. Application program 302 is designed for functions other than modem communications and interfaces with one or more serial or parallel peripheral devices, such as a printer. These devices are designated by reference numerals 307 and 308. Application program 301 communicates with modem 305 and application program 302 communicates with parallel peripheral device 307 and/or serial peripheral device 308 by instructing the operating system 304 to issue a certain instruction known as a function call. Each function call includes a specified destination. Windows COM driver 306 receives each function call and routes the function call to its specified destination. Such destinations can be modem 305, parallel peripheral device 307 and serial peripheral device 308.

Figure 4:
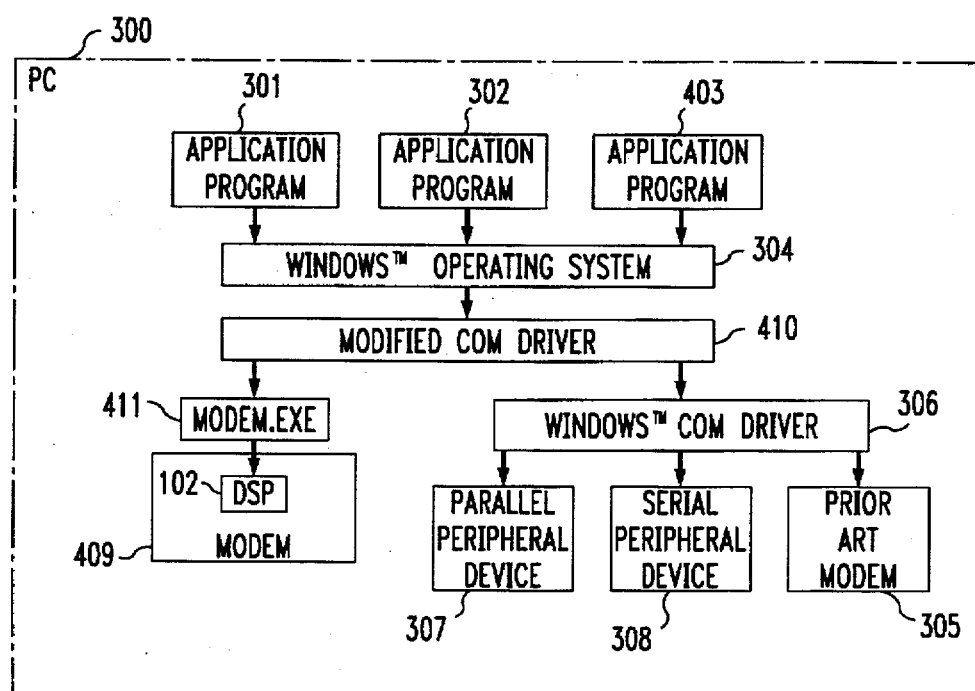
FIG. 4 is a block-schematic diagram of the architecture of the disclosed embodiment of the present invention.

The operation of Applicants' invention will now be described in reference to FIG. 4. FIG. 4 incorporates a substantial portion of the architecture of FIG. 3 and those elements in FIG. 4 providing the same function as their counterparts in FIG. 3 bear the same reference numerals. The difference between FIGS. 3 and 4 is the inclusion of application program 403, modified COM driver 410, software application program 411 and modem 409. As will be described, application program 403 is designed for modem communications with a conventional modem but, in accordance with the present invention, now operates with a modem 409 which utilizes the PC's microprocessor and associated RAM and ROM on a time-shared basis. Modem 409, therefore, only includes the DSP 102 shown in FIGS. 1 and 2.

As in the description relative to FIG. 3, each of the applications 301, 302 and 403 communicates with its associated modem and other parallel and/or serial peripheral device via computer instructions known as "function calls". Each function call has an argument which specifies its destination, i.e., whether the function call is intended for modem 305, modem 409, device 307 or device 308. As will be described, pursuant to the disclosed embodiment of Applicants' invention, all function calls from operating system 304 to COM driver 306 are examined by Modified Communications (COM) Driver 410. Driver 410 is a software layer which provides the interface required by operating system 304 along with an examination of function calls to the personal computer's communication ports. If the function call is intended for a particular communication port, then driver 410 redirects this call to another destination. Driver 410 need not provide the other functions provided by a COM driver, such as UART configuration, printer port configuration, etc., since these other functions are provided by COM driver 306. COM driver 306 includes the same code in the arrangements shown in FIGS. 3 and 4 except for the logical memory address. That is, in the arrangement of FIG. 3, COM driver 306 is resident in a logical address mandated by operating system 304. In the arrangement of FIG. 4, this logical address is now occupied by modified COM driver 410 and COM driver 306 is now resident in a logical address specified by modified COM driver 410.

As discussed above, modified COM driver 410 provides a function call examination and redirecting function. More specifically, when the function call is destined for the communication port assigned to modem 409, the modified COM driver redirects the function call to a software program 411, referred to as modem.exe. This software program executes the function call by utilizing the microprocessor within the PC on a time-shared basis. Viewing the totality of function calls directed to a conventional modem from the operating system, software program 411 implements all of the functionality performed by the prior art modem microprocessor designated as 101 in FIGS. 1 and 2.

Advantageously, the software program 411 need not be resident in the PC microprocessor RAM but can be loaded when modified COM driver 410 recognizes a particular function call destined for modem 409 and then unloaded when another particular function call destined for modem 409 is recognized. The software program 411 couples its output to modem 409 wherein the digital signal processing function performed in a modem is carried out. The major tasks provided by program 411 include command set parsing and interpretation, data compression, error correction, configuration management, speed negotiation, and providing an interface to the DSP 102. The interface to the DSP hardware is typically a proprietary one. The actual details of the code within the modified COM driver and modem.exe should be apparent to those of ordinary skill in the art with the description set forth herein. For communications in the reverse direction, the output of modem 409 is coupled through the software program 411 and then through modified COM driver 410, and operating system 304.

Figure 5:
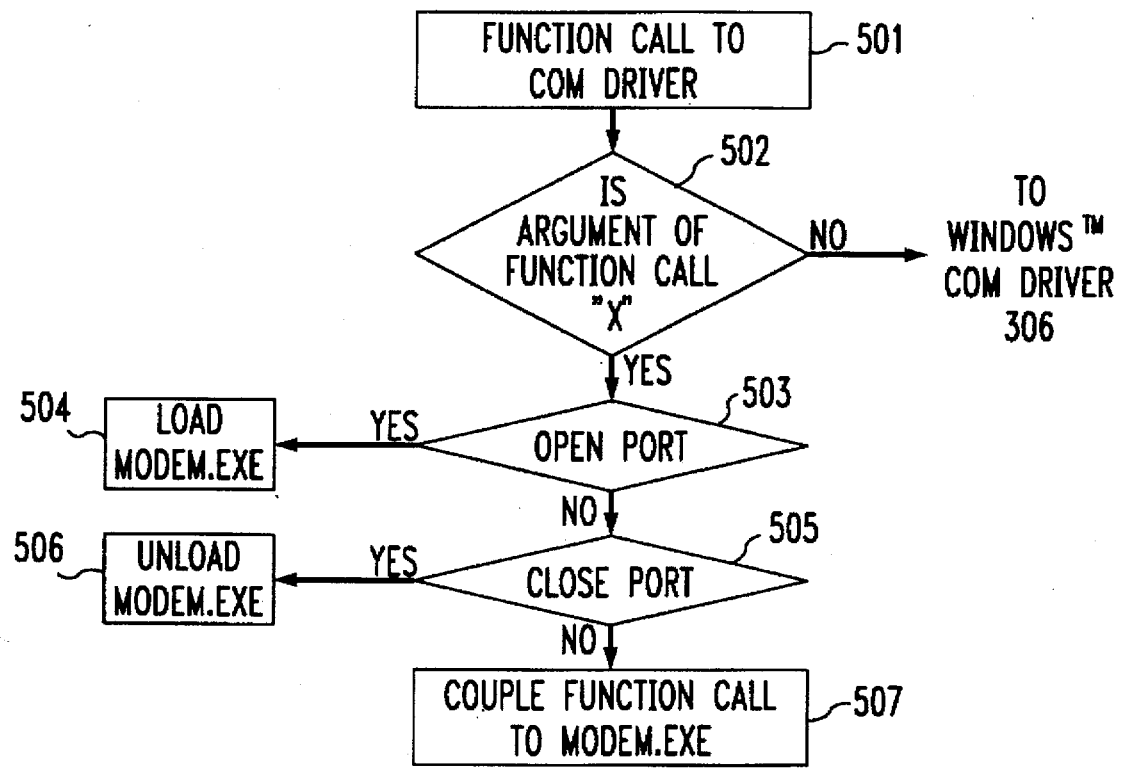
FIG. 5 is a flow chart illustrating the operation of modified communications (COM) driver 410 in FIG. 4.

Refer now to FIG. 5 which shows the sequence of operations 500 performed by modified COM driver 410 in the preferred embodiment. At step 501, the modified COM driver is activated by function calls to COM driver 306. At step 502, a determination is made as to whether the function call is directed to a predetermined destination "X". In the disclosed embodiment, this destination is modem 409. If not, the function call is directed to the COM driver 306. If the identified function call is directed to modem 409, then the modified COM driver proceeds to step 503 where a determination is made as to whether the function call is one to open a communications port. If so, then the software program modem.exe is loaded into the RAM associated with the PC microprocessor at step 504. If not, then processing proceeds to step 505 where a determination is made as to whether the function call directed to modem 409 is to close the previously opened communications port. If so, then modem.exe is unloaded at step 506. If not, then the function call destined for modem 409 is not one to open or close a communications port and the function call is coupled to the software program modem.exe. at step 507. If processing reaches step 507, then modem.exe has already been loaded.

In a PC, all peripheral devices are associated with a port having an address. Serial ports are typically designated by the label COM followed by a predetermined number which is typically between 1 and the total number of COM ports in the PC. Some of these COM ports are associated with a UART, while others are not. If the prior art modem 305 in FIG. 4 is an external one, then a UART in the PC is associated with the port address for this modem. On the other hand, for internal prior art modems, such as shown in FIG. 2, there is no UART in the PC associated with the port assigned to this modem. This association of port identifiers with physical UARTs is commonly done either with hardware configuration selections or through low level software initialization, not under the control of the Windows operating system. Similarly, each parallel port is designated by the term LPT followed by a predetermined number. This number, is typically between 1 and the total number of parallel ports in the PC. The assignment of each parallel port to a parallel peripheral device is done in a similar manner to that for serial ports.

In the disclosed embodiment of the present invention, the modified COM driver identifies those function calls whose arguments are COM "X" where X is the number that has been assigned to the serial port interfacing modem 409. Of course, the present invention is not limited for use with a single modem 409. When there is more than one such modem, the modified COM driver redirects those function calls destined for any of the ports associated with any of the modems 409.

It should, of course, be understood that while the present invention has been described in reference to a disclosed embodiment, other implementations should be apparent to those of ordinary skill in the art. For example, while in the disclosed embodiment the personal computer has more than one communication port, the present invention is also applicable to situations where the personal computer has only one communication port and this port is associated with a modem. Or, for example, while in the steps of FIG. 5, the software program modem.exe is loaded into the PC microprocessor memory and unloaded when not needed, this software program can be loaded at start up and maintained in the microprocessor memory so long as the PC is operational. Or, for example, while devices labeled 305 and 409 are modems, the term modem is not restricted to a device which solely provides an interface between data and an analog communication facility. That is, a modem may provide this capability for data and/or facsimile communications. Moreover, this ability can be implemented in a manner which permits simultaneous voice and data (including facsimile) communications. The communication facility, of course, can be wire, wireless (including cellular), optical fibers or any combination thereof. Finally, the modem can be disposed in a device which provides the above-described modem functions along with voice communications via wired, wireless (including cellular) facilities and/or voice messaging.

We claim:

1. Apparatus for use in a personal computer having a microprocessor operatively coupled to at least one communication port, said personal computer utilizing an operating system including a communications driver under control of said microprocessor, said driver receiving communications between said operating system and said communication port, certain communications from said operating system to said communication port being destined for a modem, said apparatus comprising:

means in said communications driver for receiving communications from the operating system destined for said communication port associated with said modem, and for receiving communications destined for other communication ports associated with peripheral devices other than said modem;

means in said communications driver, responsive to said received communications, for redirecting the communications destined for the communication port associated with the modem to an application program which utilizes said microprocessor and for redirecting to said other communications ports the communications destined for these other ports; and means for utilizing said application program to operate said communication port to control communications through said communication port and through said modem, said application program performing the functionality of a modem microprocessor by utilizing the microprocessor in the personal computer on a time-shared basis.

2. The apparatus of claim 1 wherein said redirecting means causes said operating system to load said application program into memory associated with the personal computer microprocessor upon receipt of a particular communication.

3. The apparatus of claim 2 wherein said particular communication is one which opens a communication port.

4. The apparatus of claim 1 wherein said redirecting means causes said operating system to unload said application program from memory associated with the personal computer microprocessor upon receipt of a particular communication.

5. The apparatus of claim 4 wherein said particular communication is one which closes a communication port.

6. The apparatus of claim 1 wherein said modem comprises a digital signal processor.

7. A method for use in a personal computer having a microprocessor operatively coupled to at least one communication port, said personal computer utilizing an operating system including a communications driver under the control of said microprocessor, said driver receiving communications between the operating system and said communication port, certain communications from said operating system to said communication port being destined for a modem, said method comprising the steps of:

receiving in said communications driver communications from the operating system destined for said communication port associated with said modem and communications destined for other communication ports associated with peripheral devices other than said modem;

redirecting in said communications driver the received communications destined for the communication port associated with the modem to an application program which utilizes said microprocessor, and to said other communication ports the communications destined for these other ports; and utilizing said application program to operate said communication port to control communications through said communication port and through said modem, said application program performing the functionality of a modem microprocessor by utilizing the microprocessor in the personal computer on a time-shared basis.

* * * * *